(12) United States Patent
Zambonelli et al.

(10) Patent No.: US 12,315,867 B2
(45) Date of Patent: May 27, 2025

(54) APPARATUS AND RELATIVE METHOD FOR WINDING STRIPS OF MATERIAL FOR THE PRODUCTION OF ELECTRICAL ENERGY STORAGE DEVICES

(71) Applicant: MANZ ITALY S.R.L., Sasso Marconi (IT)

(72) Inventors: Luca Zambonelli, Sasso Marconi (IT); Pantaleone Barbieri, Sasso Marconi (IT); Massimiliano Sale, Sasso Marconi (IT)

(73) Assignee: MANZ ITALY S.R.L., Sasso Marconi (IT)

( * ) Notice: Subject to any disclaimer, the term of this patent is extended or adjusted under 35 U.S.C. 154(b) by 346 days.

(21) Appl. No.: 17/876,731

(22) Filed: Jul. 29, 2022

(65) Prior Publication Data

US 2023/0043750 A1 Feb. 9, 2023

(30) Foreign Application Priority Data

Aug. 5, 2021 (IT) .................. 102021000021314

(51) Int. Cl.
*H01M 10/00* (2006.01)
*B65H 18/02* (2006.01)
(Continued)

(52) U.S. Cl.
CPC .... *H01M 10/0409* (2013.01); *B65H 18/0212* (2020.08); *B65H 19/26* (2013.01);
(Continued)

(58) Field of Classification Search
CPC .... B65H 18/0212; B65H 19/26; B65H 27/00; B65H 75/28; B65H 2408/231; H01M 10/0409; H01G 13/02
See application file for complete search history.

(56) References Cited

U.S. PATENT DOCUMENTS

2019/0168980 A1* 6/2019 Sale .................. B26D 5/20
2020/0365930 A1* 11/2020 Alongi ............. H01M 10/0585
(Continued)

FOREIGN PATENT DOCUMENTS

CN 103247826 A * 8/2013
JP H07172644 A 7/1995
(Continued)

OTHER PUBLICATIONS

Italian Search Report and Written Opinion in IT Application No. 20210021314, mailed Apr. 12, 2022 (9 pages) (an English translation attached hereto).

*Primary Examiner* — Emmanuel M Marcelo
(74) *Attorney, Agent, or Firm* — Leason Ellis LLP

(57) ABSTRACT

Apparatus for winding at least one strip of material for the production of electrical energy storage devices, comprising: a rotatable winding core, configured to grip the strip and actuatable to carry it in rotation and thus form a winding; a feed unit to feed the strip of material; and a handling device configured to move the winding core at least between a winding station, at which the winding core is configured to receive the strip in feeding, grip it and wind it about the rotation axis, and a second station; wherein the handling device is configured to move the winding core from the winding station to the second station during the winding.

13 Claims, 7 Drawing Sheets

(51) Int. Cl.
     *B65H 19/26*    (2006.01)
     *B65H 27/00*    (2006.01)
     *B65H 75/28*    (2006.01)
     *H01M 10/04*    (2006.01)

(52) U.S. Cl.
     CPC ............. *B65H 27/00* (2013.01); *B65H 75/28* (2013.01); *H01M 10/0431* (2013.01); *B65H 2408/231* (2013.01)

(56) References Cited

U.S. PATENT DOCUMENTS

| | | | |
|---|---|---|---|
| 2021/0376371 A1* | 12/2021 | Liang | H01M 10/0409 |
| 2023/0046940 A1* | 2/2023 | Ikeshita | H01M 10/0409 |
| 2024/0145784 A1* | 5/2024 | Kim | H01M 10/0409 |

FOREIGN PATENT DOCUMENTS

| | | | | |
|---|---|---|---|---|
| WO | WO-2009122245 A1 * | 10/2009 | | B65H 39/16 |
| WO | WO-2012020658 A1 * | 2/2012 | | H01G 11/86 |
| WO | WO-2023083178 A1 * | 5/2023 | | B65H 18/085 |

* cited by examiner

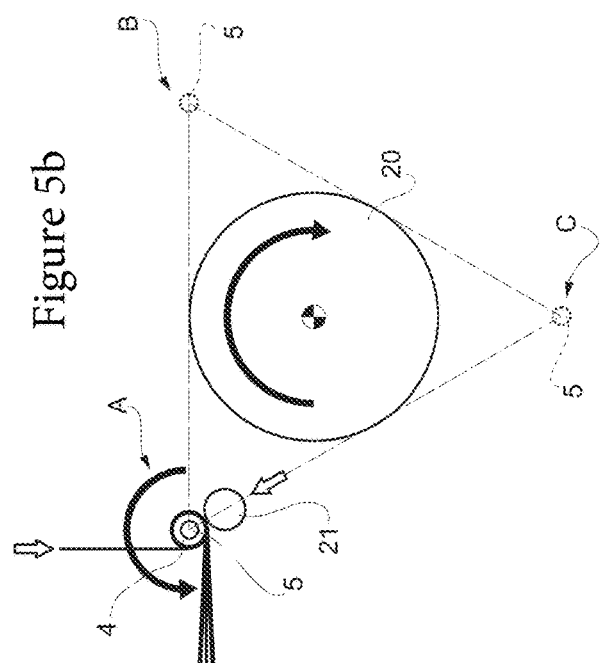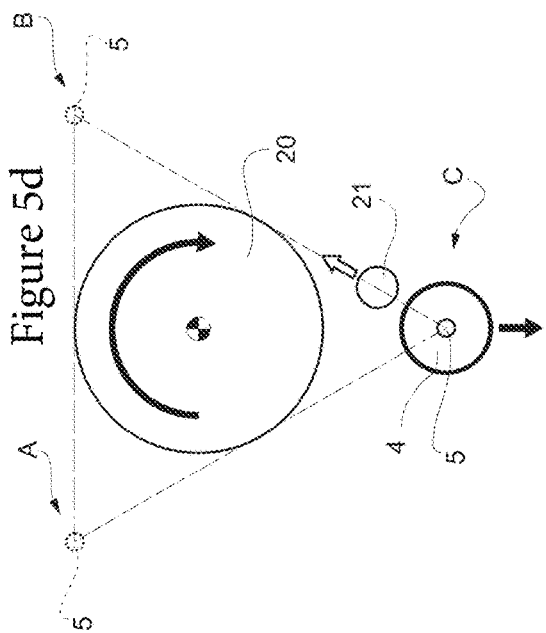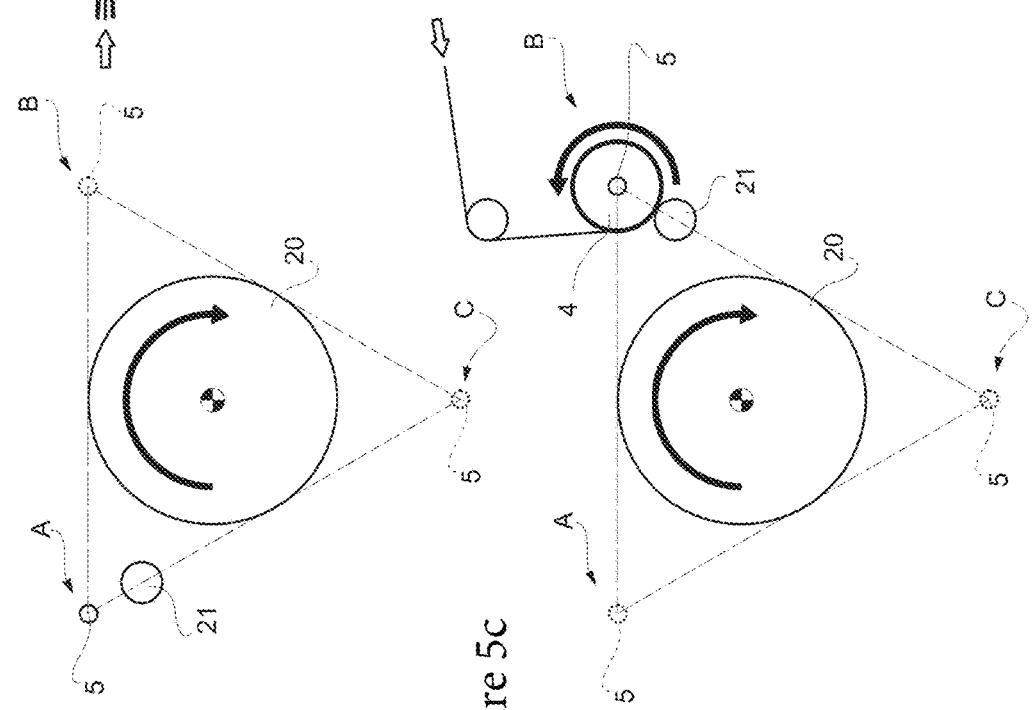

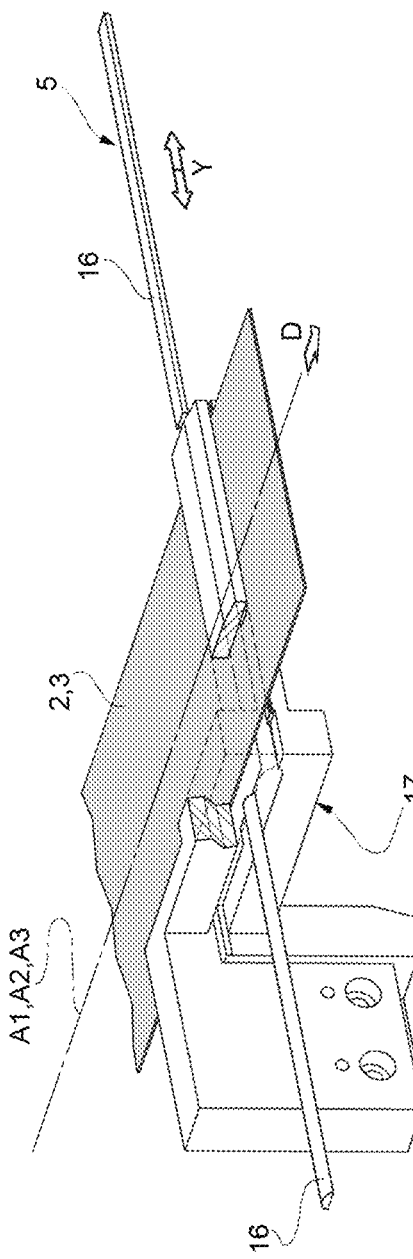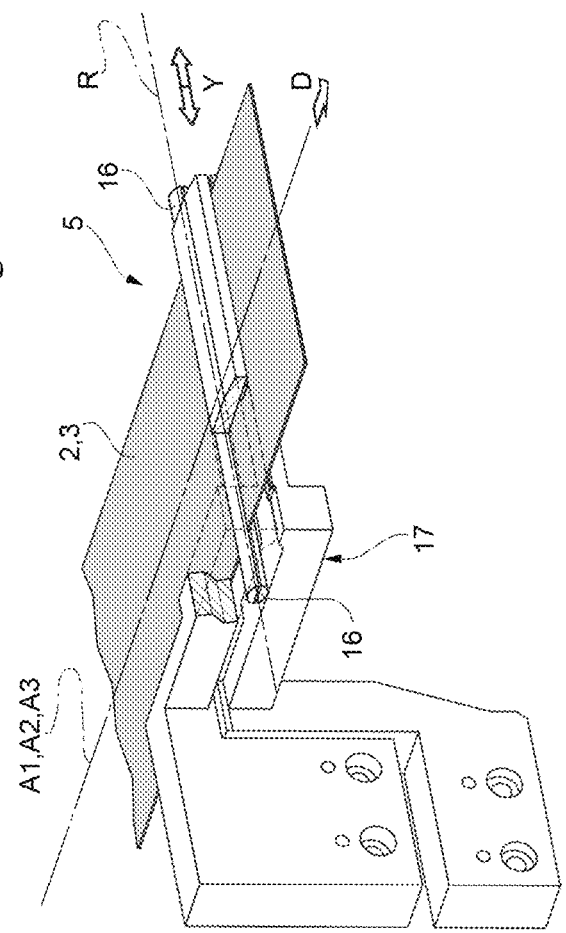

APPARATUS AND RELATIVE METHOD FOR WINDING STRIPS OF MATERIAL FOR THE PRODUCTION OF ELECTRICAL ENERGY STORAGE DEVICES

CROSS-REFERENCE TO RELATED APPLICATIONS

This patent application claims priority from Italian patent application no. 102021000021314 filed on Aug. 5, 2021, the entire disclosure of which is incorporated herein by reference.

TECHNICAL FIELD

The present invention relates to an apparatus and to a relative method for winding strips of material, in particular at least one separator strip and at least one electrode strip, for the production of electrical energy storage devices.

In particular, the present invention is advantageously, but not exclusively applied to the production of condensers or rechargeable batteries, more in particular to the production of cylindrical rechargeable batteries or anyway comprising cylindrical windings, to which the following description will explicitly refer without thereby losing generality.

STATE OF THE ART

Automatic machines for the production of electrical energy storage devices are known, and in particular of rechargeable batteries or condensers.

Rechargeable batteries usually comprise two layers of electrode (cathode and anode) and at least two layers of separator arranged staggered with respect to each other according to an alternated electrode-separator-electrode-separator scheme.

The aforementioned layers are obtained from continuous strips of material (electrode or separator) which are cut at predetermined lengths.

In the case of the aforementioned cylindrical batteries, automatic machines comprise winding apparatuses configured to feed, by means of respective feed units, the electrode strips and the separator strips along different feed paths that all converge towards a rotating winding core, which is configured to retain and wind, generally about a support having an elongated shape, the electrode strips and the separator strips arranged staggered with respect to each other, so as to form a cylindrical winding.

Specifically, the known winding apparatuses (and the known methods) provide for feeding in a first moment only the separator strips to the winding core and subsequently, after the separator strips are gripped to the winding core and have made at least a pair of turns in winding about the same, the electrode strips according to the aforementioned alternated scheme.

In this manner, the electrode strips, before or after being cut of the desired length, are retained and carried in rotation between the separator strips so as to form a (cylindrical) winding.

More specifically, a winding apparatus of the known type comprises:
  a first feed unit configured to feed two separator strips, along respective feed paths, to the winding core, in particular initially spaced from each other and subsequently converging to the winding core;
  a second feed unit configured to feed one of the electrode strips, for example the cathode, to the winding core, along a respective feed path comprised between the feed paths of the separator strips; and
  a third feed unit configured to feed the other one of the electrode strips, for example the anode, to the winding core, along a respective feed path converging to the winding core so as to be superimposed on one of the separator strips, in particular on the one radially internal relative to the winding.

In such manner, the cathode strip is fed to the winding core already interposed between the two separator strips initially open, so as to obtain the aforementioned alternated electrode-separator-electrode-separator scheme (specifically, anode-separator-cathode-separator).

The winding apparatuses of the known type further comprise respective cutting units configured to cut the respective strips (of separator and of electrode) once the predetermined winding length of each strip has been reached, i.e. once the nominal radius of the winding has been reached.

Preferably, the electrode strips are cut by means of the respective cutting units before the winding is finished, i.e. before the end of the winding process, while at least a further winding turn is performed only with the separator strips.

Subsequently, also the latter are cut by means of the respective cutting unit and the cut edges are recalled in winding by the winding core for forming the last concentric layers of the winding, while the strips are retained by respective gripping units of the winding apparatus.

Once the winding is finished, the winding is closed, for example by means of a portion of adhesive tape, in what is known as taping operation.

To such regard, the winding core is typically mounted on a rotating platform of the winding apparatus arranged and configured so that at every rotation step of such platform the winding core is moved between a winding station, where the aforementioned winding operation is performed and the winding is formed, and a closing (or taping) station, where the already formed winding is closed by means of a further winding with a portion of adhesive tape at least partially about it (for fixing the hanging edge to the rest of the winding).

In some known configurations, the rotating platform comprises a further rotation step for sequentially handling the winding between the winding station, the closing station and a discharging station, where the finished and closed winding is discharged for the following insertion thereof in a container (a can, for example cylindrical and metallic).

Typically, the winding apparatus thus comprises three winding cores, which are carried by the rotating platform and are selectively and sequentially handled thereby between the winding station, the closing station and the discharging station.

Although the aforementioned known winding methods and apparatuses are structurally and functionally valid, the Applicant observed that they can be further improved, in particular with regard to the reduction in the total production time of a winding (i.e. in the "floor to floor time") and with regard to the reduction in the stresses within the strips and, therefore, the improvement of the quality of the winding.

In fact, it is known in the sector that the "bottleneck" of the entire winding process, i.e. the step that in order to be performed requires a greater time interval over the total floor to floor time, is represented by the winding of the electrode and separator strips about the core, whereas the taping and discharging steps generally require a reduced time.

OBJECT AND SUMMARY OF THE INVENTION

The object of the present invention is to manufacture an apparatus for winding strips of material for the production of electrical energy storage devices and a relative method which are highly reliable and have a limited cost, and allow satisfying some of the above-specified needs connected to the aforementioned winding apparatuses of known type.

According to the invention, this objective is achieved by a winding apparatus and by a relative method according to what claimed in the following independent claims and, preferably, in any one of the claims directly or indirectly dependent on the independent claims.

The claims describe preferred embodiments of the present invention forming integral part of the present description.

BRIEF DESCRIPTION OF THE DRAWINGS

In order to better understand the present invention, a preferred non-limiting embodiment is described in the following, by way of mere example and with the aid of the accompanying drawings, wherein:

FIGS. 5a to 5d are schematic side views, on an enlarged scale and with parts removed for clarity, of a handling device of the apparatus of FIG. 1 during four distinct and successive operating conditions;

FIGS. 6a and 6b are perspective views, on an enlarged scale and with parts removed for clarity, of a detail of the apparatus of FIG. 1 during two distinct operating conditions.

DETAILED DESCRIPTION

Figure 1:
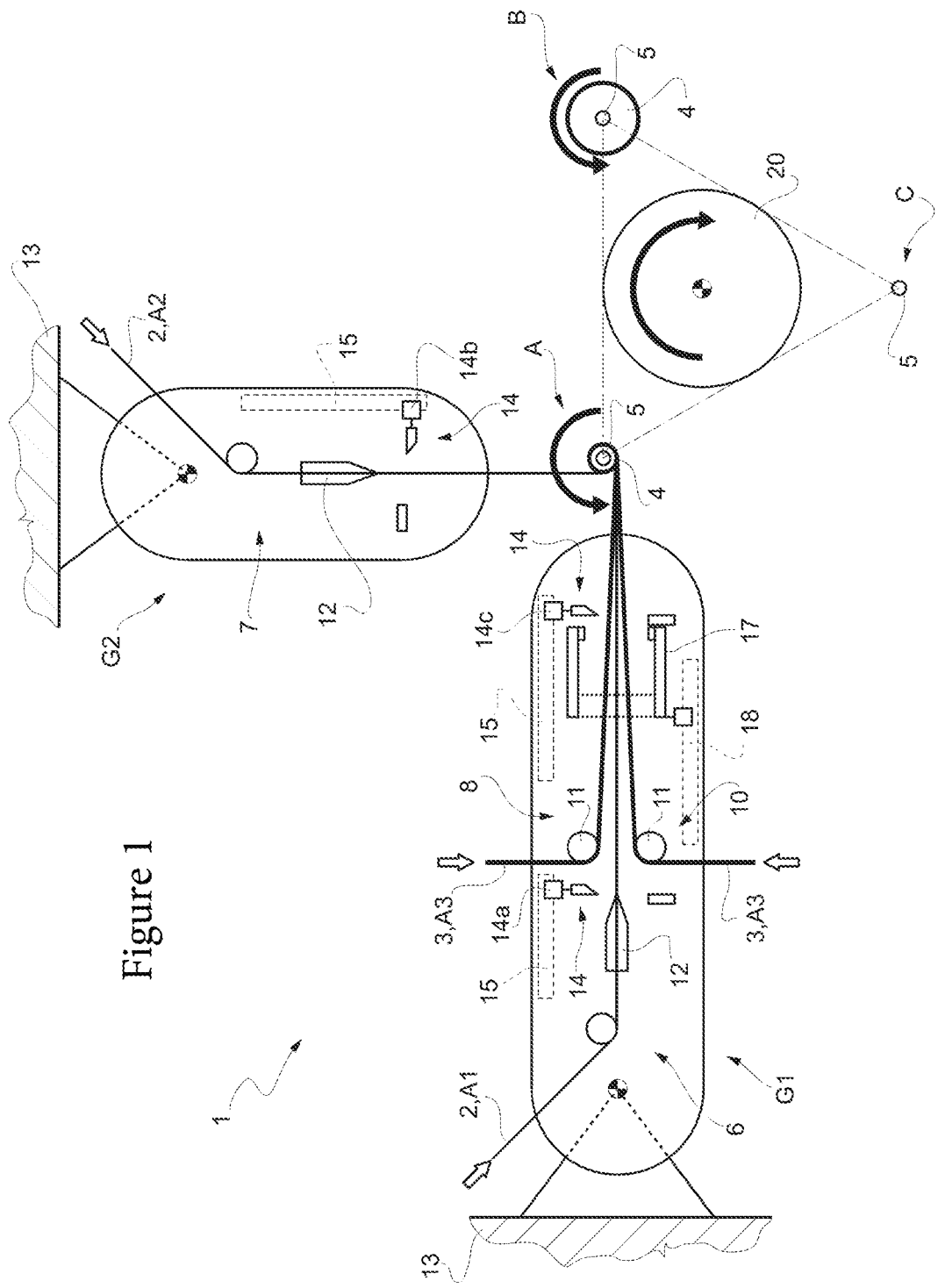
FIGS. 1 to 4 are schematic side views, with parts removed for clarity, of a winding apparatus manufactured according to the present invention and during four distinct and successive operating conditions.
Figure 2:
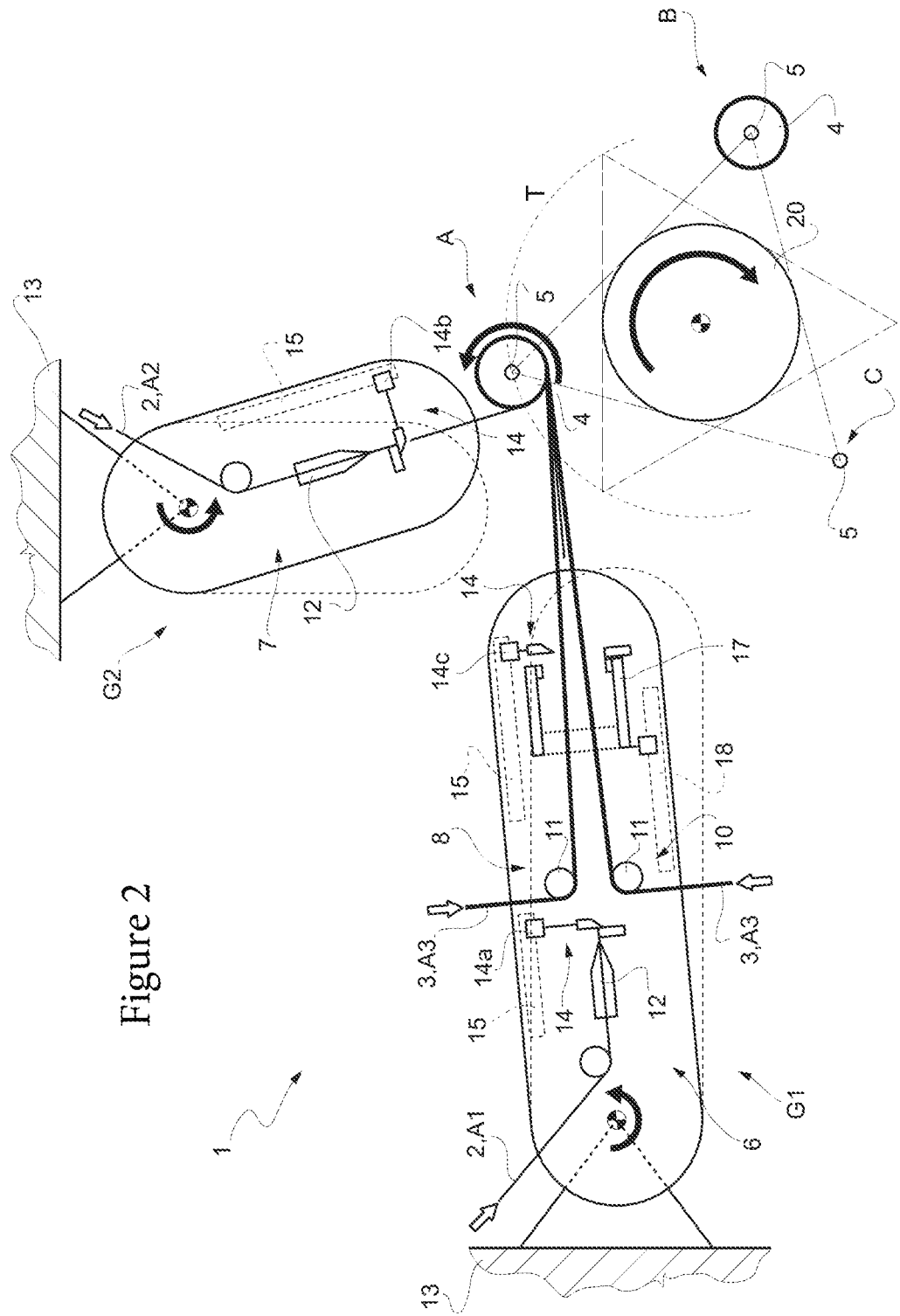
Figure 3:
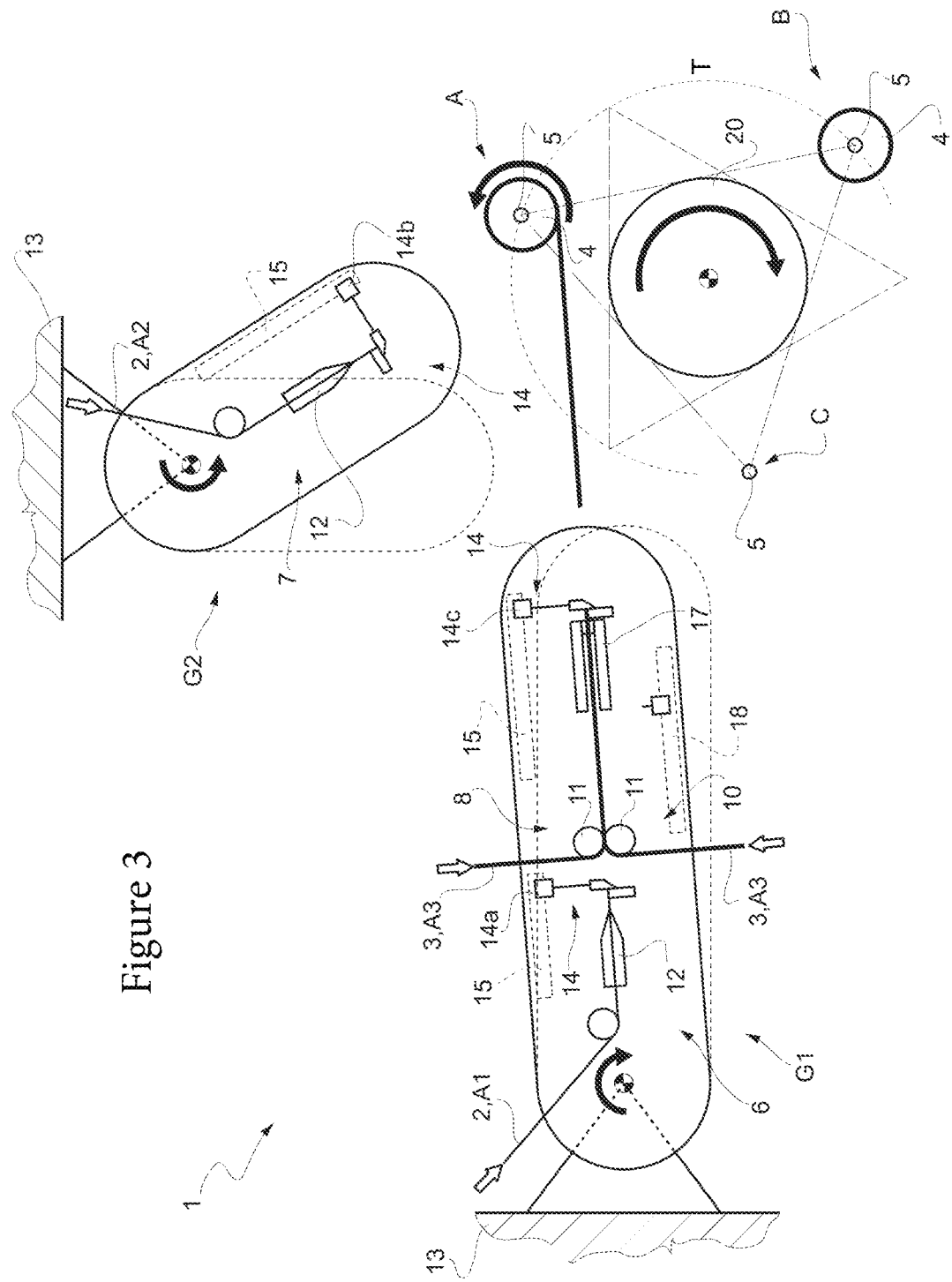
Figure 4:
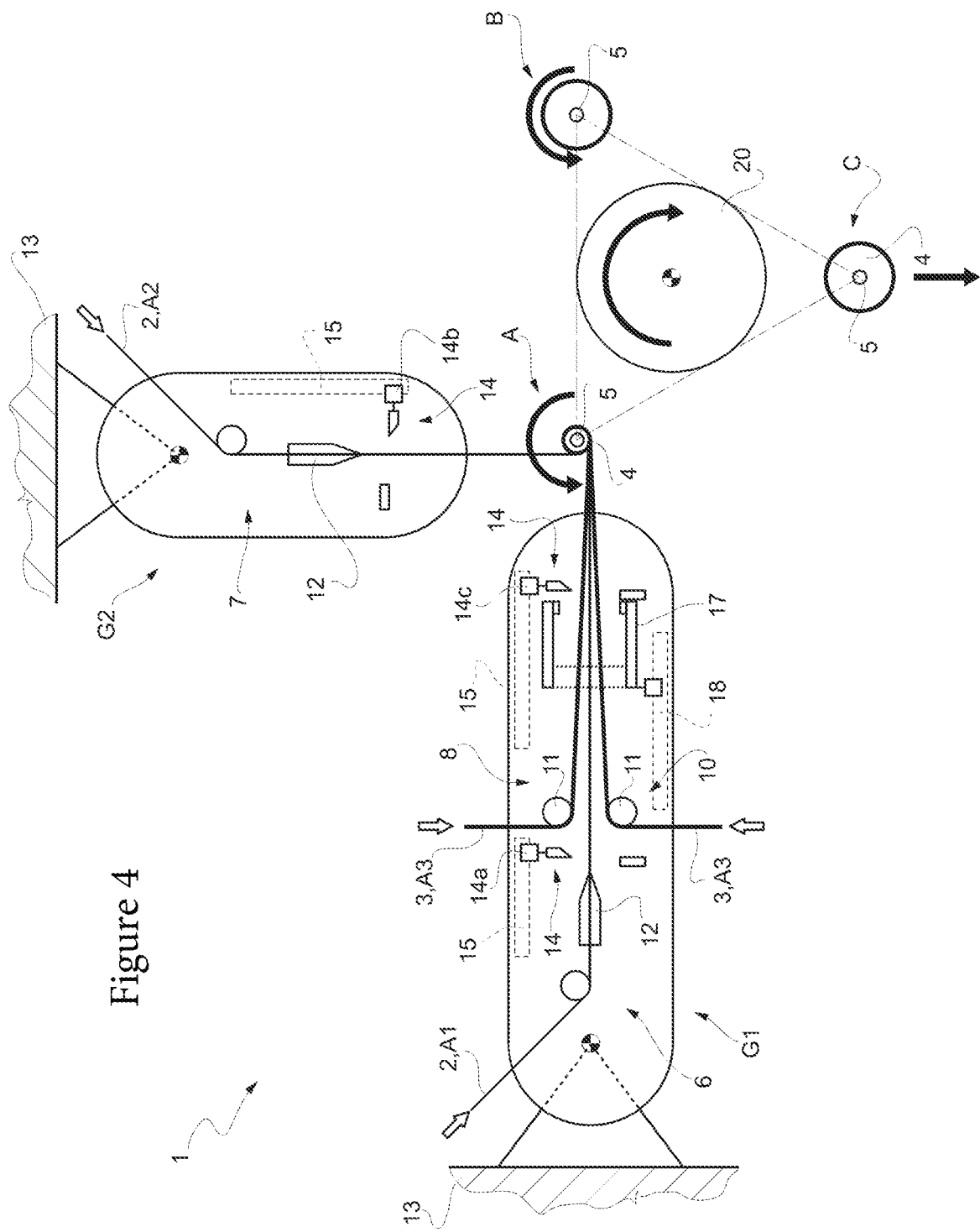

With reference to FIGS. 1 to 4, reference numeral 1 indicates as a whole an apparatus for winding at least one strip of material, in particular electrode strips 2 and separator strips 3, for the production of electrical energy storage devices.

In particular, the apparatus 1 is configured to wind the strips 2, 3 around themselves so as to form a winding 4, preferably cylindrical or oval.

More in particular, the present invention is advantageously but not exclusively applied to the production of condensers or rechargeable batteries, more in particular to the production of cylindrical or oval rechargeable batteries comprising cylindrical or oval windings 4, to which the following description will explicitly refer without thereby losing generality.

Rechargeable batteries comprise two layers of electrode (cathode and anode) and at least two layers of separator arranged staggered with respect to each other according to an alternated electrode-separator-electrode-separator scheme.

Such layers are obtained from the aforementioned continuous strips 2, 3, which are cut at predetermined lengths for composing a sequence of cylindrical windings 4.

Such cylindrical windings 4 are then, during a process downstream of the apparatus 1, arranged inside containers (usually metallic) which are then filled with an electrolyte, so as to form a respective rechargeable battery of the jelly roll type.

Therefore, in this case the apparatus 1 is used for winding two electrode strips 2, a cathode and an anode, and two separator strips 3 arranged staggered with respect to each other according to the aforementioned alternated scheme, so as to form a battery or a condenser, or more in particular a battery module or a capacitive unit of a condenser.

As is visible in FIGS. 1 to 4, the apparatus 1 comprises:
a winding core 5 (i.e. a pin) rotatable about a rotation axis R (indicated in FIGS. 6b and 7), configured to grip the strips 2, 3 and actuatable for carrying in rotation the gripped strips 2, 3 and thus forming a winding 4 with a predetermined-length portion of each strip 2, 3 about the axis R;
a first feed unit 6 for feeding a first electrode strip 2, for example a cathode strip 2, to the core 5, in particular along a respective feed path A1;
a second feed unit 7, independent of the first 6, for feeding a second electrode strip 2, for example an anode strip 2, to the core 5, in particular along a respective feed path A2; and
a third feed unit 8, independent of the first 6 and of the second 7, for feeding at least one separator strip 3, in this case two separator strips 3, to the core 5, in particular along respective feed paths A3 initially spaced and subsequently converging to the core 5.

Conveniently, the first feed unit 6 feeds, in use, the first electrode (cathode) strip 2 in a position interposed between the two separator strips 3.

In other words, the feed path A1 is comprised between the feed paths A3.

Conveniently, the feed path A2 is positioned in such a manner that the second electrode (anode) strip 2 is superimposed on the separator strip 3 radially internal relative to the winding 4.

In such manner, the cathode strip 2 is fed to the winding core 5 already interposed between the two initially spaced separator strips 3, so as to obtain the aforementioned alternated electrode-separator-electrode-separator scheme (specifically, anode-separator-cathode-separator).

More in particular, the winding apparatus 1 comprises a control unit (known per se and not illustrated nor specifically described) configured to actuate such first, second and third feed units 6, 7 and 8 to feed the electrode and/or separator strips 2, 3 to the winding core 5 so that the first electrode (in this non-limiting case the cathode) strip 2 is fed between the two separator strips 3 and the second electrode (in this non-limiting case the anode) strip 2 is arranged externally the two separator strips 3 thus ensuring the interposition of at least one separator strip 3 between the two electrode strips 2.

Specifically, the strips 2, 3 are fed to the core 5 so as to converge at the latter.

In other words, the feed paths A1, A2, A3 all converge at the core 5.

Advantageously, the axis R is arranged transversal, in particular orthogonal, to such paths A1, A2, A3, i.e. to an advancement direction D of the strips 2, 3 along such paths, as is visible in FIGS. 6a and 6b.

In order to allow the feeding of the cathode strip 2 between the separator strips 3, the third feed unit 8 comprises a spacing device 10 configured to initially keep the separator strips 3 spaced in feeding to the core 5, i.e. during their advancement along the respective feed paths A3.

In this manner, it will be possible to introduce one of the electrode strips 2, preferably the aforementioned cathode strip 2, between the separator strips 3.

In particular, the control unit is configured to control the feeding of the strips 2, 3 so that the cathode strip 2 is introduced (fed) between the separator strips 3 once the latter are gripped to the core 5, more precisely once such separator strips 3 have been wound for at least a couple of turns about the winding core 5.

Advantageously, also the second electrode strip 2, in this case the anode, is fed to the core 5 once the separator strips 3 have been wound for at least a couple of turns about the winding core 5.

According to this preferred and non-limiting embodiment, the spacing device 10 comprises a plurality of rollers 11 (two of which are illustrated) which are preferably but not necessarily motorized, can be moved away from and moved close to each other for guiding the separator strips 3 spaced from each other in advancement along the respective paths A3 towards the core 5, so as to be able to introduce (feed) between such open strips 3, by means of the first feed unit 6, the cathode strip 2.

According to alternative embodiments not illustrated, the spacing device 10 can comprise motorized grippers each configured to grip and guide the separator strips 3 spaced from each other in advancement along the respective paths A3 and along the advancement direction D.

Conveniently, the first and the second feed units 6 and 7 comprise guiding members 12 for guiding the electrode strips 2 towards the (up to the proximity of) the core 5.

In particular, the guiding members 12 are actuatable in movement relative to the core 5 and along the respective paths A1 and A2 for gripping the relative electrode strip 2 at the feeding speed at the winding core 5, which speed is given by the rotation speed of the core 5 about the axis R.

Specifically, the guiding members 12 comprise pneumatic grippers or rollers (controllable also in rotation) actuatable for gripping the relative strip 2 and for carrying out at least one moving close or moving away travel relative to the winding core 5, so as to grip the strip 2 at the feeding speed of the same and prevent undesired stretching or tensioning.

The apparatus 1 comprises a fixed frame 13.

According to the non-limiting example described and illustrated herein, the first, the second and the third feed units 6, 7 and 8 are mounted to the frame 13 in a movable manner.

In particular, the apparatus 1 comprises:

a first feeding group G1 fixed, preferably hinged, to the frame 13 and carrying the first feed unit 6 and the third feed unit 8; e a second feeding group G2 fixed, preferably hinged, to the frame 13 and carrying the second feed unit 7.

In other words, the first and the third feed units 6 and 8 are carried by the same group G1 and are thus integral in movement relative to the frame 13, whereas the second feed unit 7 is carried by the group G2 and is independent in movement relative to the other two units.

According to an alternative embodiment not illustrated, the three units 6, 7 and 8 are directly fixed to the frame 13 in a movable manner independent of each other.

With particular reference to FIGS. 6a and 6b, the winding core 5, destined to carry in rotation and wind the electrode and separator strips 2, 3, comprises two rotatable elongated elements 16 which are positioned on two different parallel (for example horizontal) planes arranged on opposite sides of the convergent paths A1, A2, A3 and are mutually movable, preferably along said planes, in particular parallel to the axis R and orthogonal to the advancement direction D and to the paths A1, A2, A3, between a resting configuration (FIG. 6a), wherein the elements 16 are staggered with respect to each other, and a winding configuration (FIG. 6b), wherein they at least partially face each other so as to retain between them and carry in rotation at least one of, in particular all, the strips 2, 3 so as to form the winding 2.

Specifically, each of the elements 16 is defined by an elongated bar with a semicircular cross section and the two elements 16 are arranged specular relative to the feed paths A1, A2, A3 convergent with the flat face of each one of the elements 16 facing the other element 16.

In use, once controlled in the winding configuration, the elements 16 grip the strips 2, 3 between them and are actuated in rotation about the axis R.

In practice, the feed paths A1, A2, A3 converge towards the rotation axis R.

Advantageously but not limitedly, the elements 16 are actuatable in travel along a direction Y transverse, preferably perpendicular, to the advancement direction D and in rotation by motor means (known per se and not illustrated, for example by an electric motor). Alternatively, each one of the elements 16 can be actuated by relative motor means independent of each other.

In accordance with what described above, the control unit is also configured to control the actuation in rotation of the winding core 5 and the aforementioned travel movement of the elements 16 along the direction Y.

The apparatus 1 further comprises at least one cutting unit 14 configured to sequentially cut the at least one strip 2, 3 of material.

In particular, the apparatus 1 comprises:

a first cutting unit 14a associated with the first feed unit 6 and configured to sequentially cut the first electrode strip 2, so as to separate successive said predetermined-length portions thereof to be fed to the core 5 for forming respective windings 4;

a second cutting unit 14b associated with the second feed unit 7 and configured to sequentially cut the second electrode strip 2, so as to separate successive said predetermined-length portions thereof to be fed to the core 5 for forming respective windings 4; and a third cutting unit 14c associated with the third feed unit 8 and configured to sequentially cut the separator strips 3, so as to separate successive said predetermined-length portions thereof to be fed to the core 5 for forming respective windings 4.

Conveniently, the cutting units 14 are identical and controllable by the control unit for cutting the respective strips 2, 3 so as to obtain the aforementioned predetermined-length portions. In particular, the aforementioned portions have a different predetermined length. In other words, the predetermined length of the first electrode strip 2 is different from the predetermined length of the second electrode strip 2, and both are different from the predetermined length of the separator strips 3, whose length difference is due, in particular, only to the different radial position in the winding 4.

Each cutting unit 14 comprises a blade and a counter-blade, whose structure and function are known per se and will not be specifically described.

Advantageously, each cutting unit 14 can be moved by a linear actuator 15 (of known type) for reaching, just like the guiding members 12, the feeding speed of the strips 2, 3 and cutting the latter at such speed, so as to prevent undesired stretching or tensioning or indentations (burrs).

In particular, each cutting unit 14 can be moved away and close relative to the core 5.

Preferably, the third feed unit 8 comprises a guiding device 17 of the type described and illustrated in the Italian patent application No. IT102021000009251 by the same Applicant, and configured to sequentially grip the separator strips 3 so as to allow the cutting thereof by the third cutting unit 14c, according to the mode described in the aforementioned patent application.

Advantageously, the guiding device 17 is also configured to carry the non-cut edge of the separator strips 3 at the core 5 for starting a new winding and forming a new winding 4, according to the mode described in the aforementioned patent application by the same Applicant.

To such regard, the third feed unit 8 comprises a linear actuator 18 configured to move the guiding device 17 close to or away from the core 5.

As is visible in the accompanying figures, the apparatus comprises a winding station A operatively positioned downstream of the first, second and third feed units 6, 7 and 8.

The apparatus 1 further comprises:

a closing device (known per se and not illustrated nor specifically described) configured to close with a layer of adhesive material, according to a known mode, the winding 4 formed during a taping process and arranged at a closing station B (or taping station) operatively positioned downstream of the winding station A; and a discharging group (known per se and not specifically described nor illustrated) of the formed and closed winding 4 arranged at a discharging station C operatively positioned downstream of the closing station B and, therefore, of the winding station A.

In accordance with what described above, the core 5 is movable between the winding station A, in which it receives the strips 2, 3 and winds them as explained above for forming one winding 4 at a time, the closing station B, where said winding 4 is closed by the closing device, and the discharging station C, in which the discharging group discharges the formed and closed winding 4.

To such end, the apparatus 1 comprises a handling device, in particular a rotating platform, still more in particular a star wheel 20 rotatable about a rotation axis, preferably parallel to the axis R, and configured to move the core 5 between the winding station A and a second station B, C at which the apparatus 1 is configured to perform on the formed winding 4 a further process successive to the winding of the strips 2, 3.

In the specific example described herein, the wheel 20 is configured to move the core 5 between the winding station A, the closing station B and the discharging station C, in particular along an arc-shaped (by circumference) trajectory T.

More precisely, the wheel 20 sequentially moves, in use, the core 5 from the winding station A, to the closing station B, then to the discharging station C, and again to the winding station A along a circular trajectory which is the sum of the arc-shaped trajectories T between the stations A, B and C.

According to other embodiments not illustrated, the apparatus 1 could not comprise one between the closing station B or the discharging station C.

In practice, the aforementioned second station can be one between the closing station B or discharging station C.

In the specific example, the second station is the closing station B.

Conveniently, the apparatus 1 comprises a plurality of winding cores 5, in particular three winding cores 5 carried by the wheel 20 and equally spaced about the rotation axis of the latter so as to each occupy one of the three stations A, B or C.

In other words, the control unit controls an angular displacement (for example by 120° per time) of the wheel 20 so that at each rotation step each core 5 is sequentially arranged in one of the three aforementioned stations A, B, C, for carrying out the entire winding process.

For the sake of brevity, reference will be made in the following to a single winding core 5 carried by the wheel 20, since the structural and functional characteristics described for such core 5 are valid for all the cores 5 carried by the wheel 20.

Suitably, the control unit is also configured to control the sequential actuation of the wheel 20 for moving the core 5 between the stations A, B and C along the trajectory T.

According to the invention, the wheel 20 is configured to move the core 5 from the winding station A to the second station during the winding about the core 5 of at least part of the aforementioned predetermined-length portion of each strip 2, 3.

In the present case, the wheel 20 is configured to move the core 5 from the winding station A to the closing station B during the winding about the core 5 of at least part of the predetermined-length portion of the electrode and separator strips 2, 3.

In particular, the control unit is configured to control the actuation (in rotation) of the wheel 20 for moving the core 5 from the winding station A to the closing station B while (the control unit) controlling the actuation in rotation of the core 5 for winding a (terminal) part of the predetermined-length portions, which are adapted to be separated from the respective strips 2, 3 by means of the respective cutting units 14.

In other words, contrary to what occurs in the known apparatuses, the core 5 is moved from the winding station A to the closing station B while it is still actuated in rotation for winding the strips 2, 3, in particular for finishing winding the strips 2, 3, about the rotation axis R.

Advantageously, the control unit is configured to control the movement of the core 5 from the winding station A to the closing station B (second station) after at least half of the predetermined-length portion of each strip 2, 3 has been wound about the core 5 (while it is in the winding station A).

Preferably, the control unit is configured to control the movement of the core 5 from the winding station A to the closing station B after at least ⅔ of the predetermined-length portion of each strip 2, 3 has been wound about the core 5 (while it is in the winding station A).

Still more preferably, the control unit is configured to control the movement of the core 5 from the winding station A to the closing station B (second station) after at least ¾ or ⅘ of the predetermined-length portion of each strip 2, 3 has been wound about the core 5 (while it is in the winding station A).

In practice, preferably the apparatus 1 is configured so that the core 5 arrives in the proximity of the closing station B when the winding 4 is formed, more precisely so that the core 5 arrives at the closing station B when the winding 4 is formed.

In other words, the apparatus 1 is configured so that the winding of said predetermined-length portion of each one of the strips 2, 3 about the core 5 is completed during the movement of the core 5 from the winding station A to the closing station B.

In other words, the apparatus 1 is configured so that the core 5 finishes winding said predetermined-length portion of each one of the strips 2, 3 between the winding station A and the closing station B.

Thanks to the above-described configuration, it is possible to reduce the total floor to floor time, since the winding time of the strips 2, 3 is partially integrated in the movement time of the core 5 from the winding station A to the second station, in particular to the closing station B.

Advantageously, each cutting unit 14 is configured to cut the respective strip 2, 3 during the movement of the core 5 from the winding station A to the second station, in the present case to the closing station B.

In particular, the control unit is configured to control, during the aforementioned movement of the core 5: firstly, the first cutting unit 14a for cutting the first electrode strip 2, i.e. the cathode strip, in particular after the gripping of the latter by means of the relative guiding member 12; subsequently, the second cutting unit 14b for cutting the second electrode strip 2, i.e. the anode strip, in particular after the gripping of the latter by means of the relative guiding member 12; and lastly, the third cutting unit 14b for cutting the separator strips 3, in particular after the gripping of the latter by the guiding device 17.

Such cuts, sequentially performed during a production cycle of a plurality of windings 4, determine the sequential separation of the predetermined-length portions from each one of the strips 2, 3.

In accordance with the present invention, such cuts take place during the movement of the core 5 from the winding station A to the closing station B.

Preferably, before reaching the closing station B, the control unit controls one last actuation in rotation of the core 5 for the winding of the cut edges of the predetermined-length portions hanging from the winding 4. At this point, the winding 4 is finally formed and is ready to be closed by the closing device at the station B.

The above-described configuration determines a further reduction in the total floor to floor time, since the time necessary for cutting the strips 2, 3 is integrated in the time for moving the core 5 from the station A to the station B.

According to a further aspect of the present invention, the apparatus 1 comprises an actuator (not illustrated) configured to drive a movement of each one of the first, second and third feed units 6, 7, 8 relative to the frame 13, during the movement of the core 5 from the winding station A to the second station, in the present case to the closing station B, so as to adjust the positioning of the respective strip 2, 3 in feeding to the core 5 as a function of the trajectory T of the latter between the winding station A and the second station.

Preferably, the actuator is of the known type and is not specifically described, for example an electric actuator (such as a brushless motor).

Specifically, the actuator is configured to drive a joint movement (i.e. combined) of the first feed unit 6 and of the second feed unit 7 relative to the frame 13, during the movement of the core 5 from the winding station A to the closing station B, so as to adjust the positioning of the respective electrode strips 2 in feeding to the core 5 as a function of the trajectory of the latter between the winding station A and the closing station B.

Since, in the non-limiting embodiment described herein, the third feed unit 8 is integral in motion with the first feed unit 6 as both are carried by the same group G1, the actuator is configured to also drive a movement of the third feed unit 8, for the same objective described above.

More precisely, in accordance with the particular embodiment described herein, the actuator is configured to drive an angular displacement of the first group G1, carrying the first and the third units 6 and 8, and of the second group G2, carrying the second unit 7, about the respective hinges (and thus relative to the frame 13), so as to adjust the positioning of the electrode strips 2 and of the separator strips 3 as a function of the trajectory followed by the core 5 during its movement from the winding station A to the closing station B. Alternatively, such movement is preferably superfluous in the case where the unit 7 is provided with insertion rollers adapted to guide the strip 2 in direction of the core 5.

In particular, since the feed path A1, A2, A3 of each strip 2, 3 is conveniently tangent to the core 5 and to the winding 4 in formation when the core 5 is at the winding station A, the groups G1 and G2 are movable relative to the frame 13, by means of the actuator, for keeping each feed path A1, A2, A3 (constantly) tangent to the winding 4 in formation (also) during the movement of the core 5 from the winding station A to the closing station B; more precisely, for keeping an input point of the strip (2, 3) in the winding (4) in a constant position relative to the core (5).

In other words, the actuator, advantageously controlled by the control unit, is configured to adjust an angular position of each group G1, G2, and thus of each feed unit 6, 7, 8, about the respective hinge so as to adjust the positioning of each strip 2, 3 in feeding as a function of the angular position of the core 5 along the arc-shaped trajectory T (thus following the position of the core 5).

Thanks to such configuration, the stresses that arise during the winding within each electrode and separator strips 2, 3 are reduced with a consequent improvement of the quality of the winding 4, since the tangent point of the strips 2, 3 in feeding to the core 5 during the winding is kept.

Such configuration is particularly advantageous in the present case, since, according to the invention, the winding continues during the movement of the core 5 from the winding station A to the closing station B. In fact, without an adaptive control of the position of the feed paths A1, A2, A3 and thus of the strips 2, 3, it would not be possible to keep the aforementioned tangent point optimal, with a possible decrease in the quality of the winding 4.

Advantageously, the actuator is also configured to drive the movement of each group G1, G2, and thus of each feed unit 6, 7, 8, also as a function of the variation of at least one dimension of the winding 4, for example its diameter, about the core 5.

In practice, the actuator is configured to drive the movement of each group G1, G2, and thus of each feed unit 6, 7, 8, as a function of the positioning of the core 5 along the trajectory T and, combined, as a function of the variation of the diameter of the winding 4 about the core 5.

In such manner, thanks to the combined adaptive control as a function of trajectory T and diameter of the winding 4, the entity of the stresses within the strips 2, 3 is further reduced and the quality of the winding 4 is further improved. In such manner, synergically, it is possible to also increase the winding speed keeping an acceptable quality of the winding 4.

Advantageously, as is shown in particular in FIGS. 5a to 5d, the apparatus 1 further comprises a retaining member 21 movable between:

an open position (FIGS. 5a, 5d), in which it is at a non-zero distance from the core 5 and from the winding 4, formed or being formed about the core 5; and a closed position (FIGS. 5b, 5c), in which it is opposed against the winding 4, being formed or formed, for exerting a pressure on each one of the strips 2, 3 of the winding 4.

Specifically, the retaining member is defined by a counter-roller 21 preferably carried by the star wheel 20, in particular carried in rotation by the wheel 20 integrally with the core 5.

In particular, each core 5 carried by the wheel 20 is associated with a respective counter-roller 21 carried by the wheel 20 in a position adjacent to the relative core 5, for cooperating with the latter. Therefore, each core 5 is provided with the respective counter-roller 21.

In such manner, the counter-roller 21 is suitably controllable by means of the control unit, in the closed position for exerting the aforementioned pressure on the strips 2, 3 of the winding 4 and allowing at the same time the correct winding thereof.

Advantageously, the counter-roller 21 is adapted to be arranged in the closed position during the movement of the (relative) core 5 from the winding station A to the closing station B.

In such manner, the strips 2, 3 are kept in a position wound in gripping to the core 5, without undergoing any loosening (or unwinding) following the cutting of the same by the respective cutting units 14.

Preferably, the counter-roller 21 is controllable for remaining in the closed position also during the closing operation at the closing station B (FIG. 5*c*).

In use, the counter-roller 21 in the closed position is controlled in the open position once the core 5 has been moved to the discharging station C, so that the discharging group can easily discharge the formed and closed winding 4.

Figure 7:
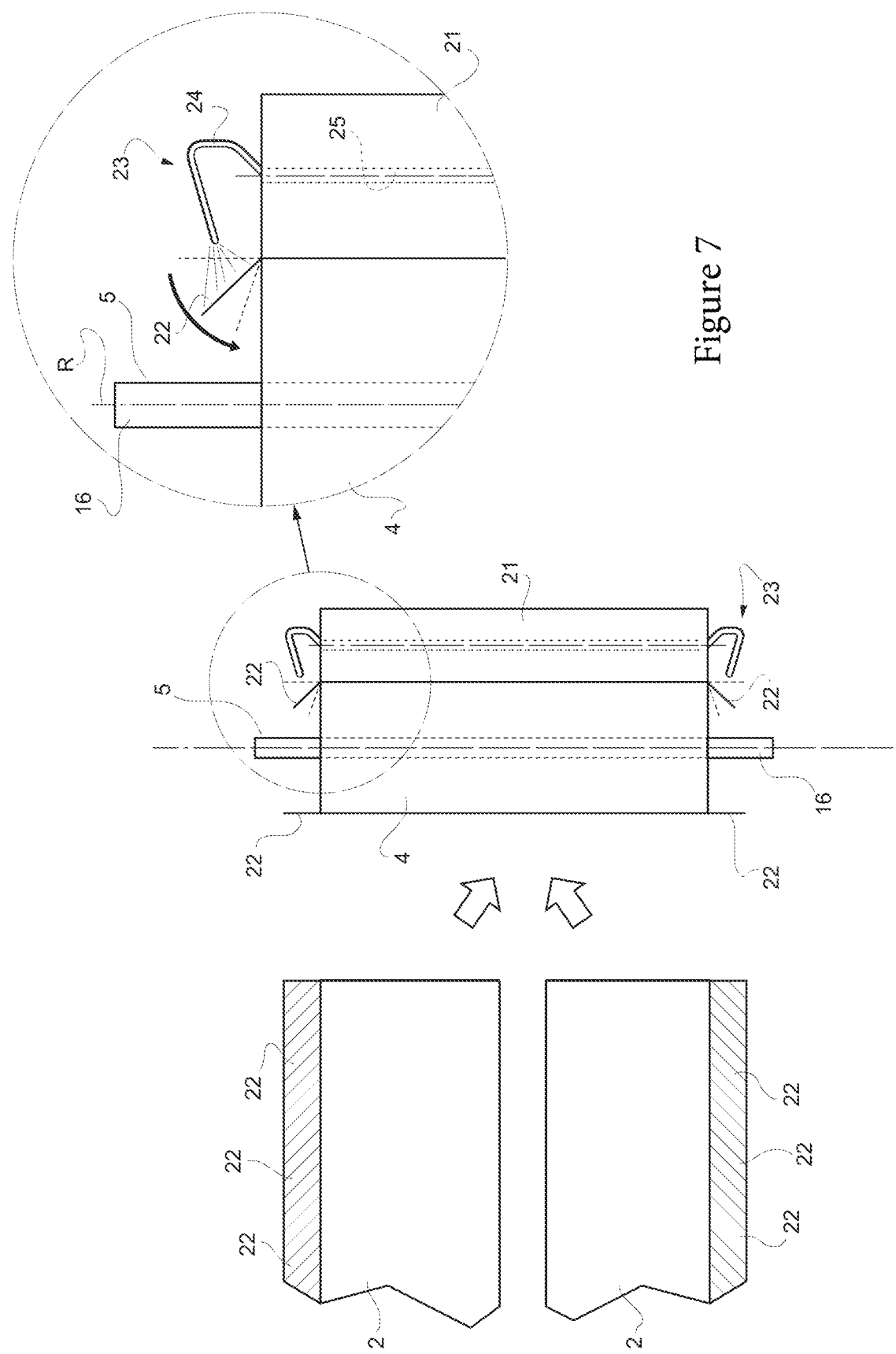
FIG. 7 is a schematic top view, on an enlarged scale and with parts removed for clarity, of a detail of the apparatus of FIG. 1, during a specific operating condition.

In the preferred and non-limiting embodiment described and illustrated herein, each electrode strip 2 comprises a series of terminal tabs 22, which project transversely from the strip 2, i.e. from a central portion thereof, relative to a longitudinal direction of extension thereof, as is shown in FIG. 7. In particular, the terminal tabs 22 are pre-cut and consecutive.

Advantageously, the apparatus 1 comprises at least one folding member 23 configured to fold the tabs 22 towards the rotation axis R of the core 5 during the winding of each electrode strip 2 about the core 5.

In particular, one of the electrode strips 2 has the tabs 22 projecting from one of its longitudinal sides, whereas the other one of the electrode strips 2 has the tabs 22 projecting from the other of its longitudinal sides opposite said one.

According to the described example, the folding member 23 is carried by the counter-roller 21 and preferably comprises at least one adjustable duct 24 adapted to direct a flow of air towards each strip 2 in winding, in particular towards the tabs 22 of the latter, for folding the tabs 22 towards the rotation axis R. In other words, the tabs 22 are folded towards the axis R one at a time as the strip 2 is unwound.

Specifically, the folding member 23 comprises two ducts 24 mounted on the counter-roller 21, at the axial ends of the latter, and fluidically connected to an air circuit 25 (only schematically illustrated) preferably obtained inside the counter-roller 21 and connected to an air source, per se known and not illustrated, for example a compressor.

Thanks to such configuration, the apparatus 1 is capable of folding the tabs 22 of the electrode strips 2 during the winding thereof to the core 5. This allows preventing a dedicated folding process, performed for example downstream or upstream of the winding, which requires dedicated folding apparatuses and increases costs and/or floor to floor time.

Therefore, the floor to floor time is further reduced.

In the light of what described above, it is clear that the apparatus 1 allows implementing a method for winding a strip of material, in particular two electrode strips 2 and two separator strips 3, for the production of an electrical energy storage device, the method comprising the steps of:

a) feeding each strip 2, 3 to the winding core 5;

b) gripping each strip 2, 3 by means of the winding core 5;

c) rotating the core 5 for carrying in rotation each gripped strip 2, 3;

d) winding, by means of step c) of rotating, each gripped strip 2, 3 about the axis R, thus forming a winding 4 from predetermined-length portions of each strip 2, 3;

e) moving the core 5 from the winding station A to a second station, in particular to the closing station B or to the discharging station C.

According to the invention, the step e) of moving is performed during at least part of the step d) of winding, as described above.

Advantageously, the method further comprises the step of:

f) adjusting, during the step e) of moving, a positioning of each strip 2, 3 in feeding to the core 5 as a function of the trajectory T of the core 5 between the winding station A and the closing station B.

It is clear that the method comprises further preferred steps, such as: cutting the strips 2, 3 during the movement of the core 5 from the winding station A to the closing station B, closing the winding 4 with the adhesive tape, exerting a pressure on the strips 2, 3 in winding for preventing a loosening thereof after the cutting of the same, folding the tabs 22 during the winding, preferably by means of a flow of air, etc.

By examining the characteristics of the apparatus 1 and the relative method embodied according to the present invention, the advantages that they allow obtaining are evident.

In particular, thanks to the above-described configuration, it is possible to reduce the total floor to floor time, since the winding time of the strips 2, 3 is partially integrated in the movement time of the core 5 from the winding station A to the second station, in particular to the closing station B.

Additionally, thanks to the fact that the cutting units 14*a*, 14*b*, 14*c* are configured to cut the respective strips 2, 3 during the movement of the core 5 from the winding station A to the closing station B, the floor to floor time is further reduced.

Furthermore, thanks to the adaptive control of the groups G1 and G2 as a function of the trajectory T of the core 5, and in particular combined as a function of the diameter variation of the winding 4, the stresses within the strips 2, 3 during the winding are reduced and, therefore, the overall quality of the winding 4 is improved.

Additionally, the presence of the counter-roller 21 allows the strips 2, 3 to be kept in a wound position in gripping to the core 5, without undergoing any loosening following the cutting of the same by the respective cutting units 14.

Finally, the advantageous configuration of the folding member 23 allows performing, easily and effectively, the folding of the terminal tabs 22 of the electrode strips 2, further reducing the total floor to floor time.

It is clear that modifications and variations can be made to the apparatus 1 described and illustrated herein without thereby departing from the scope of protection defined by the claims.

In particular, the apparatus 1 could be used for winding one single strip of material for the production of electrical energy storage devices, for example one single separator and/or electrode strip 2, 3 or any combination of strips 2, 3.

Furthermore, the aforementioned second station, which in the present case is defined by the closing station B, could be defined by the discharging station C.

The invention claimed is:

1. Apparatus (1) for winding at least one strip (2, 3) of material for the production of electrical energy storage devices, the apparatus (1) comprising:

a winding core (5) rotatable around a rotation axis (R), configured to grip said strip (2, 3) and actuatable to carry in rotation the gripped strip (2, 3) and thus form a winding (4) about the rotation axis (R) from a predetermined-length portion of said strip (2, 3);

a feed unit (6, 7, 8) to feed the strip (2, 3) of material to the winding core (5); and a handling device (20) configured to move the winding core (5) at least between a winding station (A), at which the winding core (5) is configured to receive the strip (2, 3) in feeding, grip it and wind it about the rotation axis (R), and a second station (B, C), at which the apparatus (1) is configured to perform on the formed winding (4) a further process successive to the winding of the strip;

wherein the handling device (20) is configured to move the winding core (5) from the winding station (A) to the second station (B, C) during the winding about the core (5) of at least part of said predetermined-length portion;

the apparatus comprising a fixed frame (13), wherein the feed unit (6, 7, 8) is mounted to the frame (13) in a movable manner;

and wherein the apparatus further comprises an actuator configured to drive a movement of the feed unit (6, 7, 8) relative to the frame (13), during the movement of the winding core (5) from the winding station (A) to the second station (B, C), in order to adjust the positioning of the strip (2, 3) in feeding to the core (5) according to a trajectory (T) of this latter between the winding station (A) and the second station (B, C).

2. Apparatus as claimed in claim 1, and comprising a control unit configured to control: the actuation in rotation of the winding core (5) to sequentially wind said predetermined-length portion about the rotation axis (R); and the sequential actuation of the handling device (20);

wherein the control unit is configured to control the actuation of the handling device (20), to move the winding core (5) from the winding station (A) to the second station (B, C), while commanding the actuation in rotation of the same winding core (5) to wind an end part of said predetermined-length portion.

3. Apparatus as claimed in claim 1, and comprising:

a first feed unit (6) configured to feed a first electrode strip (2) to the winding core (5); and a second feed unit (7) configured to feed a second electrode strip (2) to the winding core (5) and mounted to the fixed frame (13) in a movable manner;

wherein the actuator is configured to drive a joint movement of the first feed unit (6) and of the second feed unit (7) relative to the frame (13), during the movement of the core (5) from the winding station (A) to the second station (B, C), so as to adjust the positioning of the respective electrode strips (2) in feeding to the winding core (5) as a function of said trajectory (T).

4. Apparatus as claimed in claim 3, and comprising:

a first feeding group (G1) fixed to the frame (13) in a movable manner and carrying the first feed unit (6);

a second feeding group (G2) fixed to the frame (13) in a movable manner and carrying the second feed unit (7); and a third feed unit (8) configured to feed at least one separator strip (3) to the winding core (5) and carried by the first feeding group (G1) to be movable, by means of the actuator, integrally with the first feed unit (6) for adjusting the positioning of the separator strip (3) as a function of said trajectory (T).

5. Apparatus as claimed in claim 1, wherein the actuator is configured to drive said movement of the feed unit (6, 7, 8) as a function of the positioning of the winding core (5) along said trajectory (T) and, combined, as a function of the variation of at least one dimension of the winding (4) about the winding core (5).

6. Apparatus as claimed in claim 1, wherein the strip (2, 3) is configured to be fed along a feed path (A1, A2, A3) tangent to the winding core (5) and to the winding (4) in formation;

and wherein the feed unit (6, 7, 8) is movable relative to the frame (13), by means of said actuator, to maintain the feed path (A1, A2, A3) tangent to the winding (4) in formation formed during the movement of the winding core (5) from the winding station (A) to the second station (B, C); in particular to keep an input point of the strip (2, 3) into the winding (4) in a constant position relative to the winding core (5).

7. Apparatus as claimed in claim 1, wherein the handling device comprises a star wheel (20) carrying at least one said winding core (5) and rotatable to angularly displace the winding core (5) between the winding station (A) and the second station (B, C) along an arc-shaped trajectory (T);

wherein the feed unit (6, 7, 8) is hinged to the frame (13);

and wherein the actuator is configured to adjust an angular position of the feed unit (6, 7, 8) about the hinge so as to adjust the positioning of the strip (2, 3) in feeding as a function of the angular position of the winding core (5) along the arc-shaped trajectory (T).

8. Apparatus as claimed in claim 1, and comprising a cutting unit (14, 14a, 14b, 14c) for sequentially cutting the strip (2, 3) and separating one said predetermined-length portion at a time from the strip (2, 3) itself;

wherein the cutting unit is configured to cut the strip (2, 3) during the movement of the winding core (5) from the winding station (A) to the second station (B, C).

9. Apparatus as claimed in claim 1, and comprising a retaining member (21) movable between an open position, in which it is at a non-zero distance from the winding core (5) and from the winding (4), and a closed position in which it is opposed against the winding (4) to exert a pressure on the strip (2, 3) of the winding (4).

10. Apparatus as claimed in claim 9, wherein the retaining member is defined by a counter-roller (21) carried by the handling device (20) and controllable in said closed position to exert said pressure on the strip (2, 3) of the winding (4) and to allow, at the same time, the winding thereof;

wherein the counter-roller (21) is configured to be arranged in the closed position during the movement of the winding core (5) from the winding station (A) to the second station (B, C).

11. Apparatus as claimed in claim 1, wherein the strip (2) of material comprises a series of terminal tabs (22) projecting transversely from the strip (2) itself relative to a longitudinal direction of extension thereof;

and wherein the apparatus (1) comprises at least one folding member (23) configured to fold the terminal tabs (22) towards the rotation axis (R) during the winding of the strip (2) around the winding core (5).

12. Apparatus as claimed in claim 11, wherein the at least one folding member (23) is carried by the retaining member (21) and comprises at least one adjustable duct (24) configured to direct a flow of air towards the strip (2) in winding, in use, about the winding core (5) to bend the terminal tabs (22) towards the rotation axis (R).

13. Method for winding a strip (2, 3) of material for the production of an electrical energy storage device, the method comprising the steps of:
- a) feeding the strip (2, 3) of material to a winding core (5) rotatable around a rotation axis (R);
- b) gripping the strip (2, 3) by means of the winding core (5);
- c) rotating the winding core (5) to carry in rotation the gripped strip;
- d) winding, by means of step c) of rotating, the gripped strip (2, 3) about the rotation axis (R), thus forming a winding (4) from a predetermined-length portion of said strip (2, 3);
- e) moving the winding core (5) from a winding station (A), at which steps b) of gripping and c) of rotating are carried out, to a second station (B, C), at which a further process successive to the winding of the strip (2, 3) is carried out on the formed winding (4);

wherein step e) of moving is performed during at least part of step d) of winding;

the method further comprising the step of:
- f) adjusting, during step e) of moving, a positioning of the strip (2, 3) in feeding to the winding core (5) as a function of a trajectory (T) of the winding core (5) between the winding station (A) and the second station (B, C).

\* \* \* \* \*